United States Patent [19]

Walker

[11] Patent Number: 4,677,665

[45] Date of Patent: Jun. 30, 1987

[54] METHOD AND APPARATUS FOR ELECTRONICALLY DETECTING SPEECH AND TONE

[75] Inventor: Michael D. Walker, Webster, N.Y.

[73] Assignee: TII Computer Systems, Inc., Copiague, N.Y.

[21] Appl. No.: 709,620

[22] Filed: Mar. 8, 1985

[51] Int. Cl.[4] ............................................. H04M 3/22
[52] U.S. Cl. ....................................... 379/386; 381/46
[58] Field of Search ............ 179/84 VF; 381/46, 56; 328/138; 364/724, 484; 324/77 A

[56] References Cited

U.S. PATENT DOCUMENTS

| | | | |
|---|---|---|---|
| 4,326,256 | 4/1982 | Furumoto | 179/84 VF X |
| 4,326,261 | 4/1982 | Peoples | 179/84 VF X |
| 4,333,150 | 6/1982 | Matty et al. | 179/84 VF X |

*Primary Examiner*—James L. Dwyer

*Attorney, Agent, or Firm*—Pennie & Edmonds

[57] ABSTRACT

A method and apparatus for detecting the presence of speech telecommunications tones on a communication line includes a voltage divider for ranging signals received from a communication line, a C-weight filter which receives the ranged signals and simulates the frequency response of the human ear to noise, an RMS-to-DC converter for producing a DC signal from the output of the C-weight filter, an A/D converter for converting the DC signal into digital data and a microprocessor for receiving the digital data and controlling the invented apparatus. Energy samples obtained from an accessed telephone line are, in software, assigned various weights in accordance with the level of energy found in each sample. The microprocessor, under software control, uses the weights actually assigned to determine whether the energy sampled is due to speech or a tone.

5 Claims, 3 Drawing Figures

METHOD AND APPARATUS FOR ELECTRONICALLY DETECTING SPEECH AND TONE

CROSS-REFERENCE TO RELATED APPLICATIONS

Three related applications, incorporated herein by reference, are "Method and Apparatus for Supervising the Accessing and Testing of Communication Systems,", Ser. No. 645,478 now abandoned and a continuation of Ser. No. 645,478, Ser. No. 926,871, "Method and Apparatus for Accessing Communication System,", Ser. No. 645,875, now U.S. Pat. No. 4,629,836, and "Method and Apparatus for Testing Communication Systems", Ser. No. 645,479, now U.S. Pat. No. 4,611,101, filed on Aug. 30, 1984 and assigned to TII Computer Systems, Inc.

BACKGROUND OF THE INVENTION

This relates to the maintenance and testing of communication lines and, in particular, to the maintenance and testing of conventional telephone lines.

In the course of testing telephone lines it is generally desireable to have the capacity to detect whether the line is currently in use. Line usage, in this context, includes subscriber conversations as well as other communications applications. Because many tests of the performance of the telephone line disrupt such usage, it is advantageous to test only those lines that are not in use at the time the test begins. Thus, the capability to detect speech or tone signalling on a telecommunication line can be quite useful. In addition, although a line may appear to be in use, it may actually be off-hook, or central office equipment may have failed to release it after actual use has terminated. Having the ability to detect speech and tones, therefor, permits a busy condition signal to be tested for validity.

SUMMARY OF THE INVENTION

The present invention provides a method and apparatus for the electronic detection of speech and tones which is both accurate and relatively inexpensive to implement. Components which are also advantageously employed to determine the electrical and noise characteristics of a telephone line can be readily adapted to embody the invented apparatus and method. These components include a voltage divider, a C-weighted filter, an RMS-to-DC converter, an A/D converter and a microprocessor, all of which are found in the testing unit described in the above referenced application entitled, "Method and Apparatus for Testing of Communication Systems."

Speech and tone detection is accomplished by continuously sampling the energy present on a telephone line. These samples are examined in order to determine whether at any point during the sampling period, the energy level on the line has dropped below a noise threshold level, as well as to determine whether the total amount of energy detected is large enough to indicate that speech or telecommunications tones may be present on the line.

Each energy sample obtained from the line is ranged by a voltage divider, passed through a C-weighted filter, converted to DC by an RMS-to-DC converter and submitted to an A/D converter. A microprocessor then reads the digital output of the A/D converter and, in software, assigns the sample a "weight" the value of which depends upon the range set through the voltage divider and the output of the A/D converter. Ranges are adjusted up or down during sampling in accordance with the energy level detected.

After weights are assigned to all samples, the microprocessor, under software control, uses the weights to detect speech and tone in the following manner. Normal speech activity ordinarily includes periods during which no speech energy is present and thus any energy on the line is due solely to noise. The energy level below which energy is assumed to be due to noise is the "noise threshold," and any sample yielding such energy is assigned a particular weight during the weighting process. However, because energy levels below this noise threshold may result from a temporary break in speech activity or alternatively may indicate a total absence of speech activity, it is necessary to check whether the overall amount of energy detected during sampling is large enough to be attributable to speech. Thus, speech is considered to present on a line if at any point during sampling, as indicated by the assigned weights, the energy level falls below the noise threshold and in addition, the total amount of energy detected indicates that the energy is due to speech activity.

On the other hand, energy on a telephone line could be due to telecommunication tones, such as those used by modem devices. These tones are usually present at constant energy levels. If all samples are above the noise threshold, and a sufficient level of energy is present, then the line is assumed to be carrying a telecommunications tone.

DETAILED DESCRIPTION OF THE PREFERRED EMBODIMENT

Figure 1:
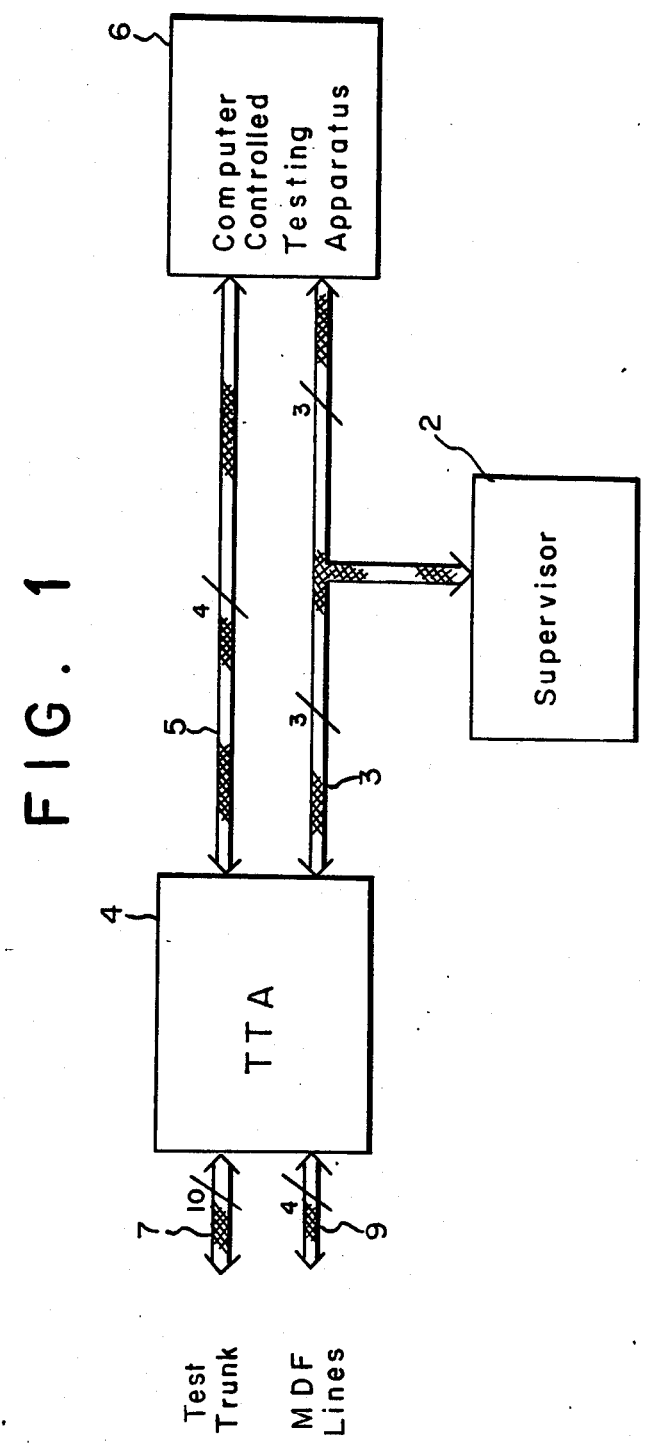
FIG. 1 is a block diagram showing an illustrative embodiment of prior art testing apparatus in which the present invention may be used.

As shown in FIG. 1, a system for maintenance and testing of communication lines comprises a supervisor unit 2, a test trunk access (TTA) unit 4 and a testing unit 6. The supervisor, TTA and the testing units are described in detail in the above-referenced applications "Method and Apparatus for Supervising the Accessing and Testing of Communication Systems," and "Method and Apparatus for Accessing Communication Systems", "Method and Apparatus for Testing Communication Systems," respectively, all of which are incorporated herein by reference. The supervisor is connected to the testing unit and to the TTA unit by a serial synchronous interface using a three-wire line 3. The TTA unit is connected to the testing unit by a four-wire line 5. To test a given communication line wire pair, the supervisor unit instructs the TTA to access the pair using ten-wire test trunk line 7 or four-wire MDF line 9.

When the TTA seeks to access lines, the unit may perform some preliminary tests to determine whether the lines can be seized. Because line testing will disrupt speech or telecommunications activity, it is desireable to be able to detect any such activity before the lines are seized so that lines actually in use can be skipped while unused lines are tested. When lines are accessed through the test trunk, the TTA can detect whether a subscriber's line is busy using the circuitry shown in FIG. 13 of the application describing the TTA. However, this busy condition may reflect an off-hook condition or a problem with central office equipment, rather than actual line usage.

Figure 2:
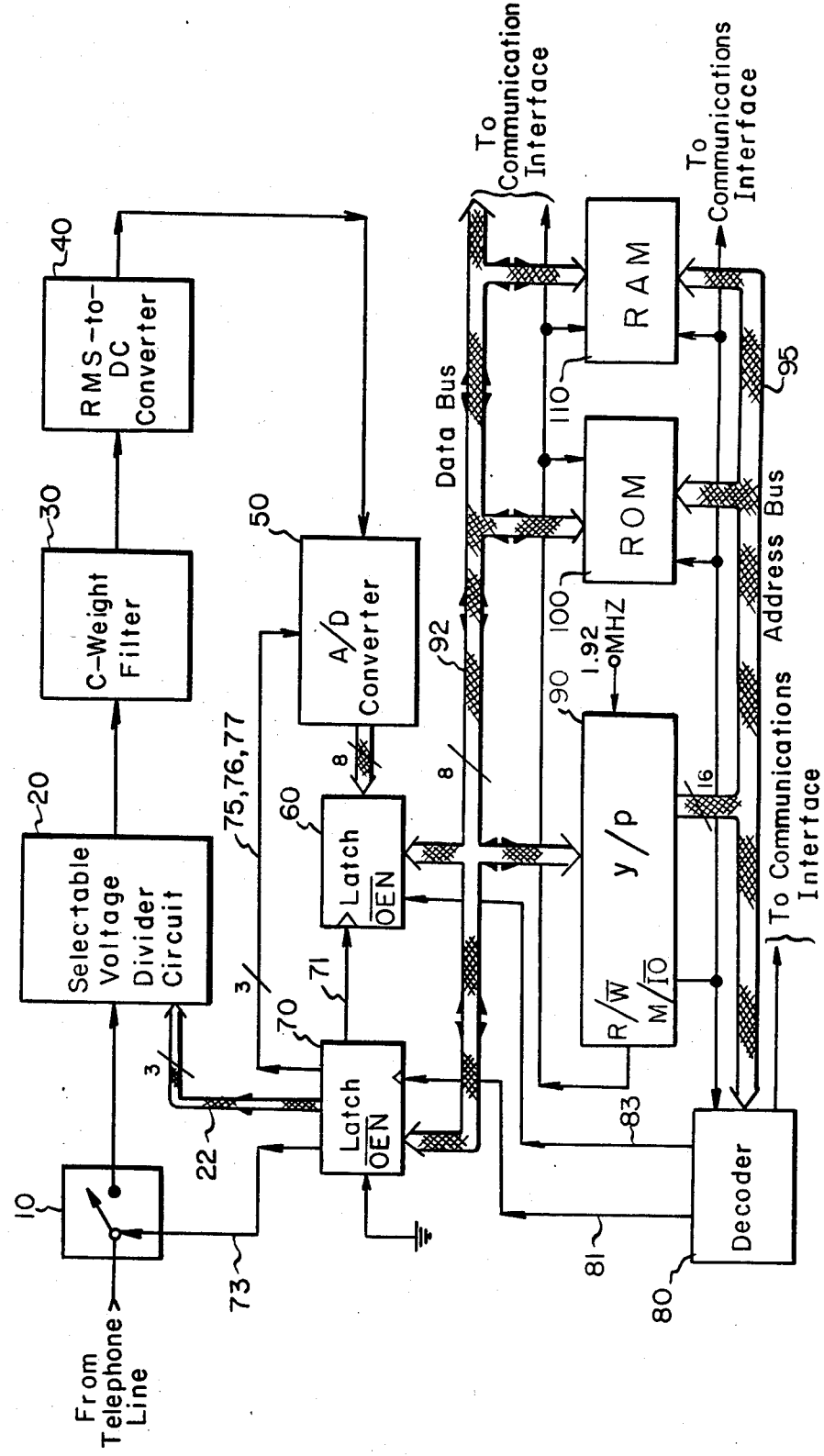
FIG. 2 depicts components for detecting speech and tones in a preferred embodiment of the invention.

In accordance with the invention, the apparatus of FIG. 2 provides for speech and tone detection and permits a busy indication to be tested for validity. The present invention is implemented using components contained within a testing unit, such as the one described in the above-referenced application "Method and Apparatus for Testing Communication Systems." To avoid obscuring various inventive features the invention will be described in FIG. 2 using a simplified block diagram of this testing unit.

FIG. 2 shows a relay 10, a selectable voltage divider circuit 20, a C-weight filter 30, an RMS-to-DC converter 40, an A/D converter 50, eight-bit latches 60, 70, a decoder 80, microprocessor 90 and RAM and ROM memories 100, 110, which are interconnected by various control lines, data bus 92 and address bus 95. Data bus 92 is used to transfer data between the microprocessor and other devices of the apparatus and address bus 95 supplies memory addressing and device selection information from said processor.

Relay 10 couples a voltage signal from a telephone line to the apparatus. Selectable voltage divider circuit 20 comprises a conventional voltage divider component, such as an Ohmtek 100-268, and at least three relays used to select three voltage divider ranges or decades: a low range where the input voltage is divided by 1, a middle range where the input voltage is divided by 10, and a high range, where said voltage is divided by 100. Three-wire control line 22 controls the relays in ciruit 20 and thus determines the ratio of input voltage to output voltage. C-weighted filter 30 operates on the signal from divider circuit 20 so as to simulate the response of a human ear to noise; and RMS-to-DC converter 40, illustratively an AD636JD, converts an input signal into a DC output having a voltage equal to the RMS value of said input signal. A/D converter is preferably an ICL 7109 that converts an analog input signal into a 12-bit digital value. This value is read by the microprocessor by sampling the A/D converter's eight-bit output twice.

Latches 60, 70 are coupled to data bus 92 and are clocked by lines 71 and 81, respectively. Latch 70 receives data from the microprocessor 90 over data bus 92 and supplies control signals for relay 10, selectable voltage divider circuit 20 and A/D converter 50, and latch 60 receives data from the A/D converter and supplies this data to the microprocessor via said data bus. In the presently preferred embodiment, microprocessor 90 is a Z80 device running at 1.92 MHZ.

To operate the various devices of the apparatus, microprocessor 90 loads latch 70 using data bus 92. When the processor performs an I/O operation and places appropriate address information on address bus 95, decoder 80, illustratively a 74138 device, supplies a clock signal over line 81 to cause latch 70 to accept data from said data bus. The decoder also provides an output enable signal using line 83 to latch 60 when data is to be obtained by the processor from the latch, as well as control signals to a communication interface (not shown).

Read-only-memory (ROM) 100 and Read/Write memory (RAM) 110 are addressed using address bus 95, and data bus 92 is used to transfer data and instructions between said memories and microprocessor. ROM 100 may comprise programmable read only memory devices such as 2764 or 27128 components, while RAM 110 is illustratively constructed using 6116 or 6264 devices. The microprocessor provides R/$\overline{\text{W}}$ and M/$\overline{\text{IO}}$ control signals to the ROM and RAM memories and to the communications interface.

A communications interface allows the apparatus to receive and send data and requests from other equipment, such as the TTA and supervisor units described in the above-referenced applications entitled "Method and Apparatus for Accessing Communications Systems" and "Method and Apparatus for Supervising the Accessing and Testing of Communications Systems".

When operated by an appropriate control signal on line 73, relay 10 couples a voltage signal received from an accessed telephone line to selectable voltage divider circuit 20. In accordance with control signals supplied over three-wire line 22, said divider circuit fractionates the received voltage signal for ranging and couples this fractionated signal to C-weighted filter 30, where the frequency response of the human ear to noise is simulated. RMS-to-DC converter 40 receives the output of C-weight filter 30 and converts this C-weighted output into a DC signal having a voltage equal to the RMS value of said C-weighted output. This DC signal is supplied to A/D converter 50, which converts it into a 12-bit digital value when enabled by an appropriate control signal on line 75. The microprocessor reads the 12-bit digital value by coupling a control signal through latch 70 to line 76 to cause said converter to output the least significant eight bits to latch 60, while also causing latch 70 to couple a clock signal to latch 60 over line 71. The processor can then obtain the eight-bit value from latch 60 using data bus 92 by causing decoder 80 to couple an output enable signal to said latch over line 83. A/D converter is then read a second time using control line 77, which causes the converter to output the most significant four bits as well as an overrange indication bit.

Microprocessor 90, under control of software, uses the digital values obtained from A/D converter to detect the presence of speech or tone on a telephone line as follows.

Figure 3:
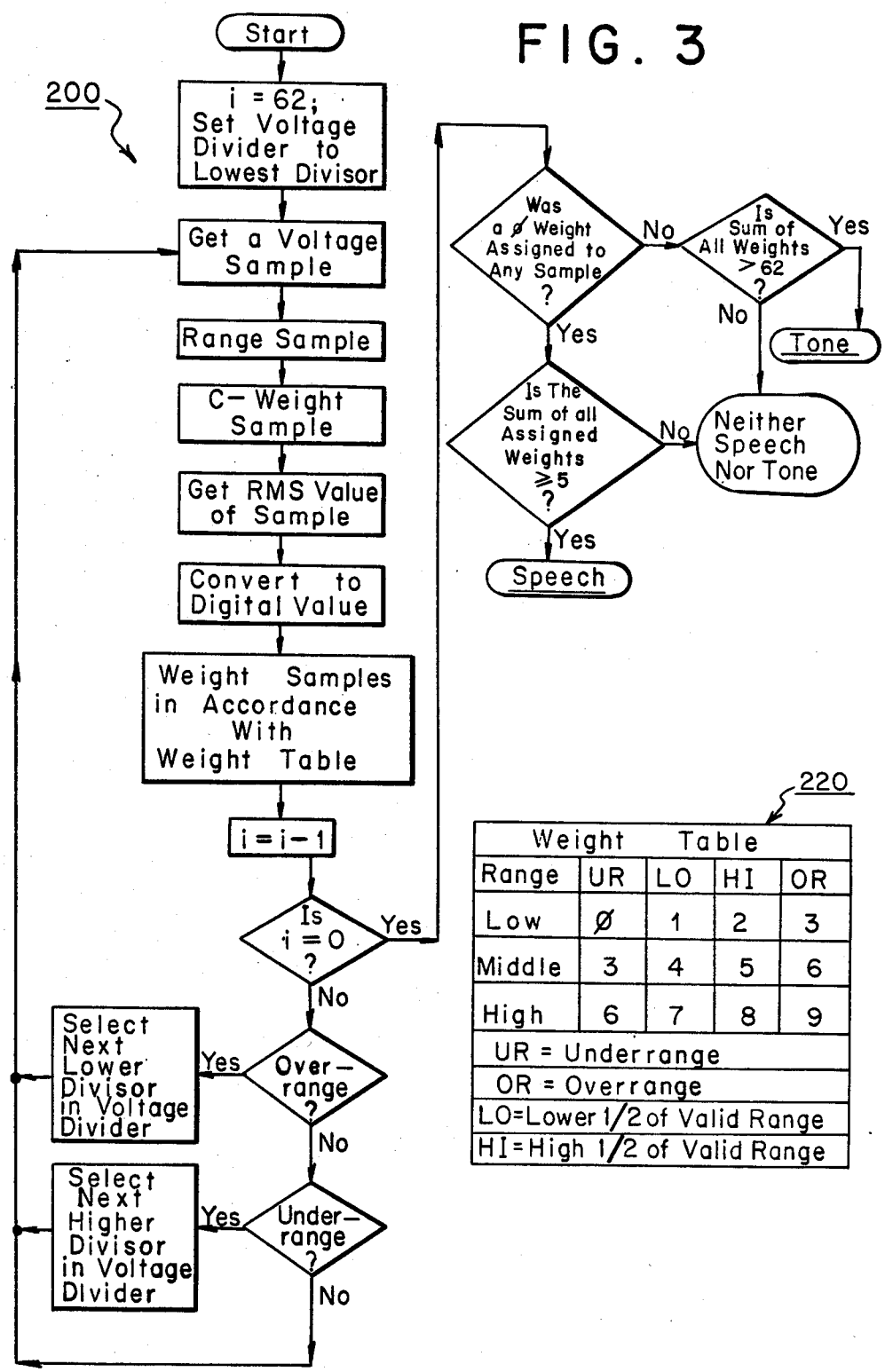
FIG. 3 is a flow chart showing a preferred method of practicing the invention and a table for assigning weights.

In the presently preferred mode of operation, which is illustrated by flowchart 200 of FIG. 3, selectable voltage divider 20 is initially set to the low range which divides the voltage signal received from a communication line by 1. After being processed by C-weight filter 30 and converted by RMS-to-DC converter 40, the sample is then provided to A/D converter 50. The processor obtains the result of the A/D conversion and assigns the sample a weight in accordance with weight table 220 shown in FIG. 3. The assigned weight is stored preferably in RAM 110.

The weight table depicts the different weights that are assigned to a given sample depending upon the range implemented by the selectable voltage divider, whether the analog-to-digital conversion results in an underrange or overrange, or whether the converted value represents a voltage in the upper or lower half of the valid voltage range of the A/D converter.

In the illustrative embodiments, the maximum valid input voltage is 4.095 VDC, and voltages above this level will result in the overrange (OR) indication bit, described above, being set. Voltages which are less than nine percent of the maximum voltage, or 0.3686 VDC are considered to be too small for a valid A/D conversion and are denoted underranges (UR). Accordingly, the upper half of the valid range of voltages (HI) is between 2.232 and 4.095 VDC, and the lower half of said range (LO) is between 2.2231 and 0.3686 VDC. Note that the voltages set forth above do not necessarily represent potential on the telephone line as this potential is ranged by selectable voltage divider circuit 20 before being presented to the A/D converter.

If an underrange occurs during the analog-to-digital conversion, the microprocessor causes appropriate control signals to be coupled to three-wire line 22 so as to select the next greater resistance in the selectable voltage divider, if any. Alternatively, if an overrange occurs, the microprocessor causes the next lesser resistance to be selected.

When the apparatus is in operation, voltage from the telephone line is continuously coupled thereto and is further continuously fractionated by selectable voltage divider 20, processed by C-weight filter 30, converted to RMS value, DC voltage by RMS-to-DC converter 40, and converted to a digital value by A/D converter 50.

At a rate of once every 135 milliseconds the A/D converter value is read by the microprocessor using control lines 76, 77. This value is in turn used to assign weights and to range the apparatus using selectable voltage divider circuit 20. Illustratively, sixty-two samples are taken in total. When all the samples have been obtained, the microprocessor examines the assigned weights to determine whether speech or tone is present.

As shown in flowchart 200, FIG. 3, if a "zero" weight is assigned to one or more samples and the sum of all assigned weights is at least five, than speech is assumed to be present on the telephone line. A zero weight, is denoted a "noise threshold" weight because energy at and below the level is considered to be due solely to noise. Since ordinary speech always contains periods during which no speech energy is present on the telephone line, the absence of a zero weight ensures that the voltage detected is due to activity other than speech. However, this weight could indicate either a break in speech activity or the total absence of speech. Thus, it is necessary to check whether during the sampling period the total energy present is great enough to be attributable to speech, which in the illustrative embodiment is signified by a weight sum which is at least five.

Telecommunications tones, as opposed to speech, are generally present at constant energy levels. If no "zero" weight was assigned during the sampling period, which indicates that there were no periods during the sampling when only noise energy was present, and in addition, the total of all the assigned weights is greater than 62, then a tone is presumed to be present on the line.

While the invention has been described in connection with specific embodiments, it is evident that numerous alternatives, modifications, and variations will be apparent to those skilled in the art in light of the foregoing description.

What is claimed is:

1. A method for detecting the presence of speech and telecommunications tones on a communication line comprising the steps of:
   taking a plurality of energy samples from the communication line during a given sampling period;
   assigning to each sample a weight in accordance with the level of energy detected in said sample, where the lowest value of said weights, a noise threshold weight, $N_t$, is assigned when the energy detected in said sample is not greater than a predetermined noise threshold level;
   determining whether the weight $N_t$ was assigned to any sample;
   outputting a speech detection signal if said $N_t$ weight was assigned to any of said samples and the sum of the weights assigned to all of said smples is greater than a predetermined speech threshold level; and
   outputting a tone detection signal if said $N_t$ weight was not assigned to any of said samples and the sum of the weights assigned to all of said samples is greater than a predetermined tone threshold level.

2. The method of claim 1 wherein each said energy sample is obtained by:
   coupling a voltage signal from said communication line to a voltage divider for fractionating said signal;
   passing said fractionated signal through a C-weighted filter for producing a C-weighted signal;
   providing said C-weighted signal to an RMS-to-DC converter for obtaining a DC signal having a voltage that is a function of the RMS value of said C-weighted signal;
   coupling said DC signal to an A/D converter for obtaining a digital output representing the voltage of said RMS signal; and
   supplying said digital output to a microprocessor for assigning a weight to said digital output in accordance with the energy level of said sample.

3. The method of claim 1 wherein said $N_t$ weight is assigned when an underrange condition occurs while said voltage divider is dividing said voltage signal by the lowest available divisor.

4. A method for detecting the presence of speech and telecommunications tones on a communications line comprising the steps of:
   taking a series of voltage samples from the communication line during a sampling period;
   coupling said voltages from the communication line to a voltage divider having a plurality of selectable divisors for obtaining a fractionated voltage;
   passing said fractionated voltages through a C-weighted filter;
   converting the output signals of said C-weighted filter to DC signals where each DC signal has a voltage that is a function of the RMS value of the C-weighted output signal from which it was converted;
   coupling said DC signals to the input of an A/D converter for converting said DC signals to digital values;
   assigning weights to said voltage samples where the weight assigned to any particular sample depends upon the divisor selected in said voltage divider, whether the analog-to-digital conversion of said voltage resulted in an underrange or an overrange, and the magnitude of said digital values;
   selecting the next lower divisor of said voltage divider when an underrange occurs;
   selecting the next higher divisor of said voltage divider when an overrange occurs;
   outputting a speech detect signal if the weights assigned indicated that an underrange occurred when the lowest divisor of said voltage divider was selected, and that the total voltage measured is enough to be attributable to speech; and outputting a tone detect signal if the weights assigned indicate that an underrange did not occur when the lowest divisor of said voltage divider was selected and that the total voltage measured is high enough to be attributable to telecommunication line.

5. An apparatus for detecting the presence of speech and tones on a communication line comprising;

means for selectively coupling a first voltage signal from a telephone line to said apparatus;

voltage divider means having an input for receiving said first voltage signal from the communication line and an output for supplying a second voltage signal that is a fraction of said first voltage signal;

means for selectively altering the divisor in said voltage divider for changing the ratio of input voltage to output voltage;

means for performing a C-weighting operation upon a signal received from said voltage divider output and producing a C-weighted signal;

means for converting said C-weighted signal to a DC signal having a voltage that is a function of the RMS value of said C-weighted signal;

A/D converter means for converting the DC signal to a digital value, said converter means having outputs for supplying said digital value, an overrange signal, indicating an overrange condition when said DC signal exceeds the maximum valid input voltage of said A/D converter;

microprocessor means having input and output means for controlling said coupling means, for receiving through said input means said digital value and overrange signal, for determining whether said digital value is the result of an underrange condition and is too low for a valid A/D conversion, for assigning a weight to said digital value with the value of said weight depending upon the divisor selected in said voltage divider, whether an overrange or an underrange condition resulted from the A/D conversion process, and the magnitude of said digital value, for controlling said altering means in order to range the voltage received from said telephone line when an overrange or an underrange occurs, and for computing from said weights whether speech or tone is present on said telephone line;

software means for controlling said microprocessor means; and memory means for storing said software and as well as data used by said microprocessor.

* * * * *